United States Patent [19]

Takeda et al.

[11] Patent Number: 5,782,485
[45] Date of Patent: Jul. 21, 1998

[54] ACTUATING-JUDGMENT SYSTEM FOR SAFETY DEVICE FOR PROTECTING OCCUPANT ON FRONT PASSENGER SEAT

[75] Inventors: Masaru Takeda; Mitsuru Ono; Etsujiro Imanishi; Yasushi Tsuji, all of Kobe, Japan

[73] Assignee: Sensor Technology Co., Ltd., Kobe, Japan

[21] Appl. No.: 666,472

[22] PCT Filed: Dec. 27, 1994

[86] PCT No.: PCT/JP94/02243

§ 371 Date: Jul. 1, 1996

§ 102(e) Date: Jul. 1, 1996

[87] PCT Pub. No.: WO95/18028

PCT Pub. Date: Jul. 6, 1995

[30] Foreign Application Priority Data

Dec. 29, 1993 [JP] Japan ................. 5-352529

[51] Int. Cl.⁶ .......................................... B60R 21/16
[52] U.S. Cl. ..................... 280/735; 340/438; 701/45
[58] Field of Search .......................... 280/735, 734, 280/732, 730.1; 180/272, 273, 274, 282; 340/436, 438; 701/45

[56] References Cited

U.S. PATENT DOCUMENTS

| | | | |
|---|---|---|---|
| 5,071,160 | 12/1991 | White et al. | 280/735 |
| 5,118,134 | 6/1992 | Mattes et al. | 280/735 |
| 5,330,226 | 7/1994 | Gentry et al. | 280/735 |
| 5,446,661 | 8/1995 | Gioutsos et al. | 280/735 |
| 5,605,348 | 2/1997 | Blackburn et al. | 280/735 |

FOREIGN PATENT DOCUMENTS

| | | | |
|---|---|---|---|
| 0 357 225 A1 | 3/1990 | European Pat. Off. | |
| 0 473 324 A1 | 3/1992 | European Pat. Off. | |
| 38 02 159 | 8/1989 | Germany | 280/735 |
| 40 05 598 A 1 | 8/1991 | Germany | |
| 41 12 579 A 1 | 10/1991 | Germany | |
| 40 23 109 | 1/1992 | Germany | 280/734 |
| 43 41 500 A 1 | 6/1994 | Germany | |
| 94/22693 | 10/1994 | WIPO | 280/735 |

*Primary Examiner*—Peter C. English
*Attorney, Agent, or Firm*—Oblon, Spivak, McClelland, Maier & Neustadt, P.C.

[57] ABSTRACT

A system for judging to permit actuating a safety device for protecting an occupant seated on the passenger seat of a vehicle. The system is capable of detecting a rearward facing child seat. The system is able to judge in many situations as to whether it is necessary to permit actuating the safety device. The safety device has an air bag storing portion holding an air bag therein. The storing portion is located in front of the front passenger seat. On rapid deceleration of the vehicle, the safety device is set into actuation to inflate the air bag. The system uses plural distance sensors to detect the distances to an upper portion and a lower portion, respectively, of an object existing in the space between the air bag storing portion and the passenger seat. According to the output signals from the distance sensors, the system judges as to whether it is necessary to permit actuating the safety device.

14 Claims, 19 Drawing Sheets

Fig. 3

| D1 < D2 | D1 ≥ D2 ||
|---|---|---|
| | D1 = S | D1 = L or M |
| × | ○ | ◎ |

L: long distance;   ◎ permission to actuate

M: medium distance;   ○ permission to actuate with warning

S: short distance;   × non-permission to actuate but warning

| state of front passenger seat | | distance sensors | | | result of judgement | ideal result of judgement |
|---|---|---|---|---|---|---|
| | | (1) | (2) | relation | | |
| adult | An adult sits in a normal posture. | L | S | D1 > D2 | ◎ | ◎ |
| | An adult holds a small piece of baggage. | L | S | D1 > D2 | ◎ | ◎ |
| | An adult holds a large piece of baggage. | M, S | S | D1 ≥ D2 | ◎ – ○ | ◎ |
| | An adult holds a child. | M, S | S | D1 ≥ D2 | ◎ – ○ | ◎ |
| | An adult places his legs on instrument panel. | S | M, S | D1 < D2 | × (*42) | ◎ |
| | An adult leans on instrument panel. | S | M, S | D1 < D2 | × (*43) | ◎ |
| | An adult tilts the seat and lies down. | L | S | D1 > D2 | ◎ | ◎ |
| | An adult tilts the seat and lies down. The legs are placed on instrument panel. | S | M, S | D1 < D2 | × (*44) | ◎ |
| child | A child sits in a normal posture. | L | S | D1 > D2 | ◎ | ◎ |
| | A child is standing on the floor. | S | S | D1 ≥ D2 | ○ | ◎ |
| | A child is standing on the seat. | L, M | L, M | D1 ≥ D2 | ◎ | ◎ |
| child seat | forward facing | only seat, no child | M | M | D1 > D2 | ◎ (*45) | × |
| | | seat on which a child sits | M | M | D1 > D2 | ◎ | ◎ |
| | | A child sits on the seat, and is covered with a blanket. | M | M | D1 > D2 | ◎ | ◎ |
| | rearward facing | only seat, no child | M, S | M | D1 < D2 | × | × |
| | | A child sits on the seat. | M, S | M | D1 < D2 | × | × |
| others | Neither person nor baggage is on the seat. | L | L | D1 > D2 | ◎ (*46) | × |
| | A medium-sized piece of baggage is on the seat. | L, M | M | D1 ≥ D2 | ◎ (*47) | × |
| | An animal (e.g., a medium-sized dog) is on the seat. | M, S | M, S | D1 > D2 | ◎ – ○ | — |
| | An animal (e.g., a medium-sized dog) is on the floor. | L | L, S | D1 > D2 | ◎ | — |

FIG. 6

| infrared sensor | distance | | |
|---|---|---|---|
| | $D1 < D2$ | $D1 \geq D2$ | |
| | | $D1 = S$ | $D1 = L, M$ |
| P | ○ | ○ | ◎ |
| U | × | ○ | ◎ |
| A | × | × | × |

L: long distance  ◎: permission to actuate

M: medium distance  ○: permission to actuate with warning

S: short distance  ×: non-permission to actuate but warning

P: presence of a heat source

U: inability to judge

A: no heat source

FIG. 9

| state of front passenger seat | | distance sensors | | | infrared sensor | result of judgement | ideal result of judgement |
|---|---|---|---|---|---|---|---|
| | | (1) | (2) | relation | | | |
| adult | An adult sits in a normal posture. | L | S | D1 > D2 | P | ◎ | ◎ |
| | An adult holds a small piece of baggage. | L | S | D1 > D2 | P-U | ◎ | ◎ |
| | An adult holds a large piece of baggage. | M, S | S | D1 ≥ D2 | P-U | ◎–○ | ◎ |
| | An adult holds a child. | M, S | S | D1 ≥ D2 | P | ◎–○ | ◎ |
| | An adult places his legs on instrument panel. | S | M, S | D1 < D2 | P-U | ○–×(*42) | ◎ |
| | An adult leans on instrument panel. | S | M, S | D1 < D2 | P-U | ○–×(*43) | ◎ |
| | An adult tilts the seat and lies down. | L | S | D1 > D2 | P-U | ◎ | ◎ |
| | An adult tilts the seat and lies down. The legs are placed on instrument panel. | S | M, S | D1 < D2 | P-U | ○–×(*44) | ◎ |
| child | A child sits in a normal posture. | L | S | D1 > D2 | P | ◎ | ◎ |
| | A child is standing on the floor. | S | S | D1 ≥ D2 | P-U | ○ | ◎ |
| | A child is standing on the seat. | L, M | L, M | D1 ≥ D2 | P-U | ◎ | ◎ |
| child seat | forward facing: only seat, no child | M | M | D1 > D2 | A | (*45) | × |
| | forward facing: seat on which a child sits | M | M | D1 ≥ D2 | P | ◎ | ◎ |
| | forward facing: A child sits on the seat, and is covered with a blanket. | M | M | D1 > D2 | P | ◎ | ◎ |
| | rearward facing: only seat, no child | M, S | M | D1 < D2 | A | × | × |
| | rearward facing: A child sits on the seat. | M, S | M | D1 < D2 | A | × | × |
| others | Neither person nor baggage is on the seat. | L | L | D1 > D2 | A | ×(*46) | × |
| | A medium-sized piece of baggage is on the seat. | L, M | M | D1 ≥ D2 | A | ×(*47) | × |
| | An animal (e.g., a medium-sized dog) is on the seat. | M, S | M, S | D1 ≥ D2 | P | ◎–○ | — |
| | An animal (e.g., a medium-sized dog) is on the floor. | L | L, S | D1 > D2 | P | ◎ | — |

| second distance | first distance | |
|---|---|---|
| | (no object)<br>D4 < T1, D4 > T2 | (object is present)<br>T1 ≤ D4 ≤ T2 |
| (no object)<br>D5 < T3, D5 > T4 | ×× | ×× |
| (object is present)<br>T3 ≤ D5 ≤ T4 | ◎ | ○ |

T1: lower threshold value of D4  ◎: permission to actuate

T2: upper threshold value of D4  ○: permission to actuate with warning

T3: lower threshold value of D5  ××: non-permission to actuate but warning

T4: upper threshold value of D5

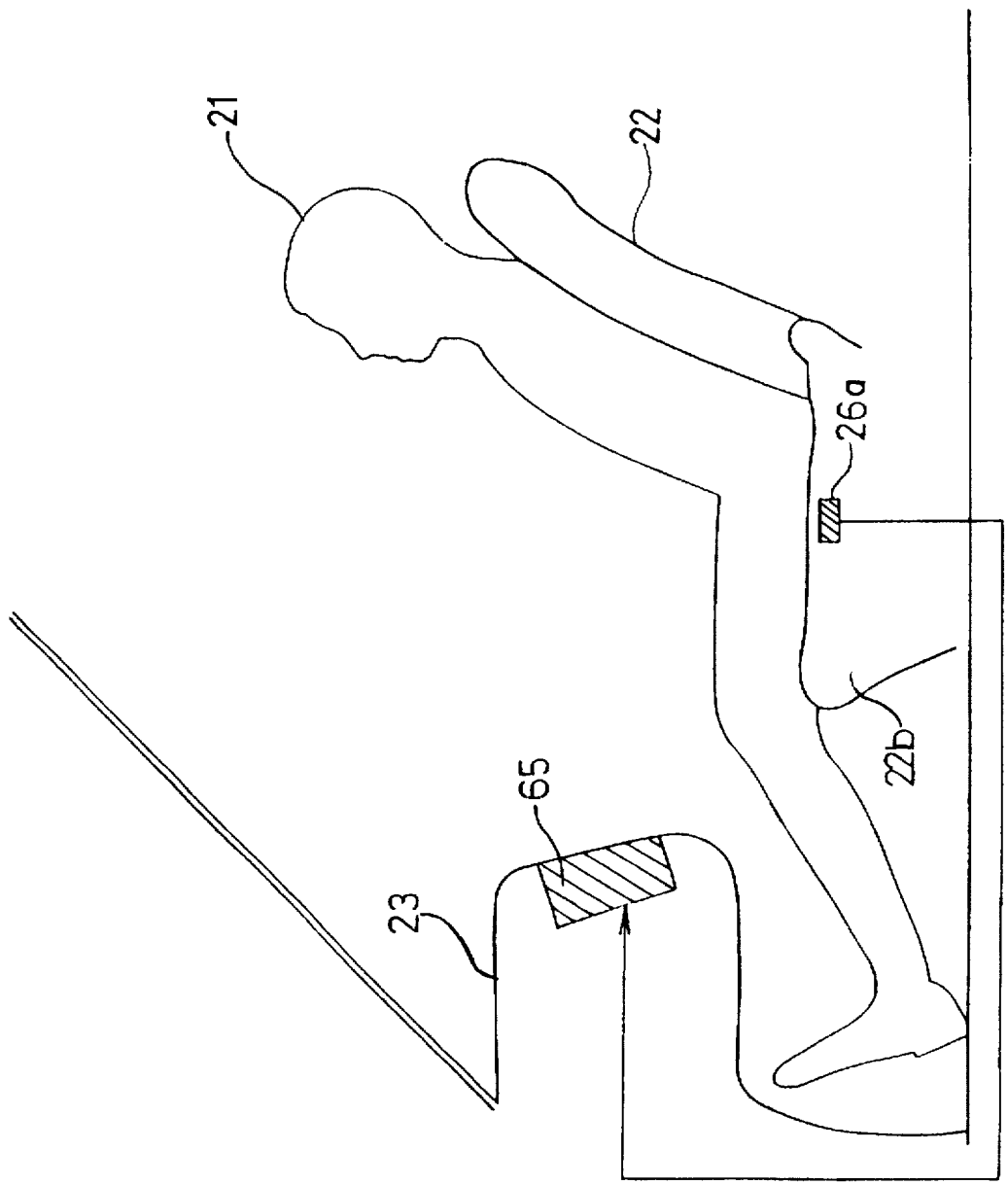

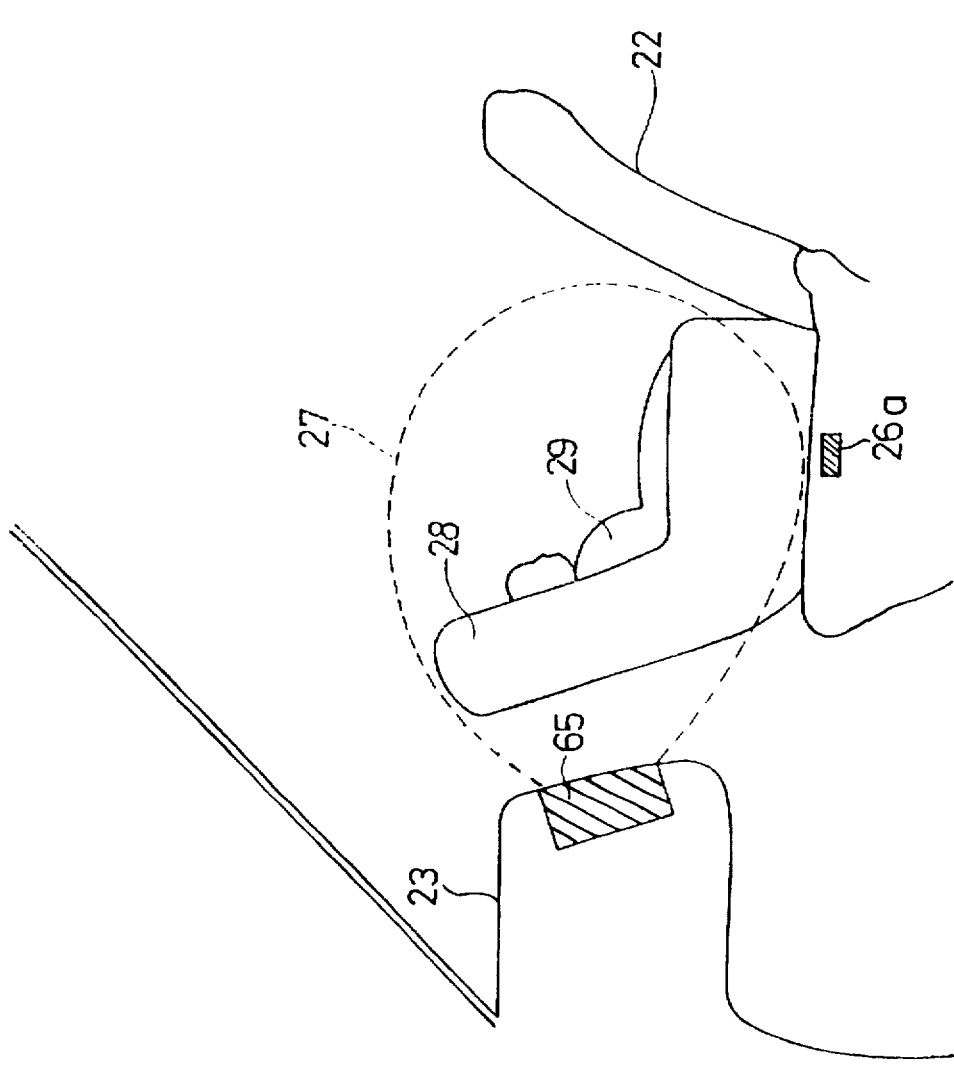

1

ACTUATING-JUDGMENT SYSTEM FOR SAFETY DEVICE FOR PROTECTING OCCUPANT ON FRONT PASSENGER SEAT

TECHNICAL FIELD

The present invention relates to an actuating judgment system for safety device for protecting occupant on the front passenger seat of a vehicle and, more particularly, to an actuating judgement system capable of detecting a rearward facing child seat and of judging in various situations as to whether an actuation of the safety device is required or not.

BACKGROUND ART

One known system of this kind for an actuating-judgment system for safety device for protecting occupant on the front passenger seat makes use of a occupant sensor, as described in Japanese Utility Model Laid-Open No. 130857/1989. As shown in FIG. 18, this occupant sensor has a pressure sensor 26a mounted in a portion 22b of the passenger seat 22 of a vehicle which includes a safety device 65 installed inside of the instrument panel 23. The pressure sensor 26a is connected with the safety device 65. The pressure sensor 26a senses whether a passenger 21 sits in the seat 22 or not. If the passenger 21 is absent, an air bag in the safety device 65 is not allowed to inflate. If the passenger 21 sits in it, the air bag in the safety device 65 is permitted to inflate.

The aforementioned actuating-judgement system employing the occupant sensor has a disadvantage that the pressure sensor 26a detects a rearward facing child seat 28 as the occupant when the rearward facing child seat 28 is placed on the passenger seat as shown in FIG. 19, and then the aforementioned actuating-judgement system permits the air bag in the safety device 65 to inflate. In another words, the rearward facing child seat 28 faces rearward as viewed in the traveling direction of the vehicle so as to protect the child against impact from the vehicle collision. Furthermore, the child seat is provided with a cushion. Therefore, it is not necessary to actuate the air bag system. If the air bag system was actuated as indicated by the broken line 27, strong impact would damage an infant 29.

In view of the foregoing problems with the prior art techniques, the present invention has been made. It is an object of the present invention to provide an actuating-judgment system for safety device for protecting occupant on front passenger seat, which is capable of detecting a rearward facing child seat and of judging in various cases as to whether an actuation of such a safety device as an air bag is required or not.

DISCLOSURE OF INVENTION

In order to solve the above-mentioned problems, an actuating judgment system for safety device for protecting occupant on front passenger seat comprising one or more distance sensors so as to detect the distance between an air bag storing portion and an object placed on the front passenger seat in a vehicle. The actuating-judgement system of the present invention judges as to whether an actuation of such a safety device as an air bag is required or not according to the output signals from the distance sensors. The distance toward the object in a certain direction can be measured by employing distance sensors. Accordingly, in one aspect of the present invention, a plurality of distance sensors are used to identify the shapes of the objects located in different zones. This makes it possible to make a precise judgement as to whether the actuation of safety device should be required or not.

In another aspect of the invention, an air bag inflation-inhibited zone and an air bag inflation-permitted zone are established. If any objects are located in the inflation-inhibited zone, the air bag system is inhibited from being actuated in order to avoid a danger. If an object to be protected such as a human body exists in the inflation-permitted zone, the air bag system is permitted to be actuated. The presence or absence of an object in at least one of these two zones is detected. Thus, a more precise judgement is made as to whether the safety device should be actuated.

In a further aspect of the invention, the system is connected to a means for actuating a pre-tensioner for the seat belt of the passenger seat, as well as to the safety device for inflating the air bag. This pre-tensioner for the seat belt can be actuating according to the result of a judgement made as to whether an actuation of the safety device is required or not.

BRIEF DESCRIPTION OF DRAWINGS

FIG. 3 shows the judgement rules in the actuating-judgement system shown in FIG. 1;

FIG. 6 shows the effect of the actuating-judgement system shown in FIG. 1;

FIG. 9 shows the judgement rules in the actuating-judgement system shown in FIG. 7;

FIG. 10 shows the effect of the actuating-judgement system shown in FIG. 7;

FIG. 13 shows the judgement rules in the actuating-judgement system shown in FIG. 11;

FIG. 18 is a schematic side view showing of the prior art actuating-judgement system, the system being for use with a safety device for protecting an occupant seated on the passenger seat of a vehicle, illustrating the arrangement of the components of the system near the passenger seat;

FIG. 19 is a schematic side view showing similar to FIG. 18, but in which a rearward facing child seat is placed.

BEST MODE FOR CARRYING OUT THE INVENTION

Figure 1:
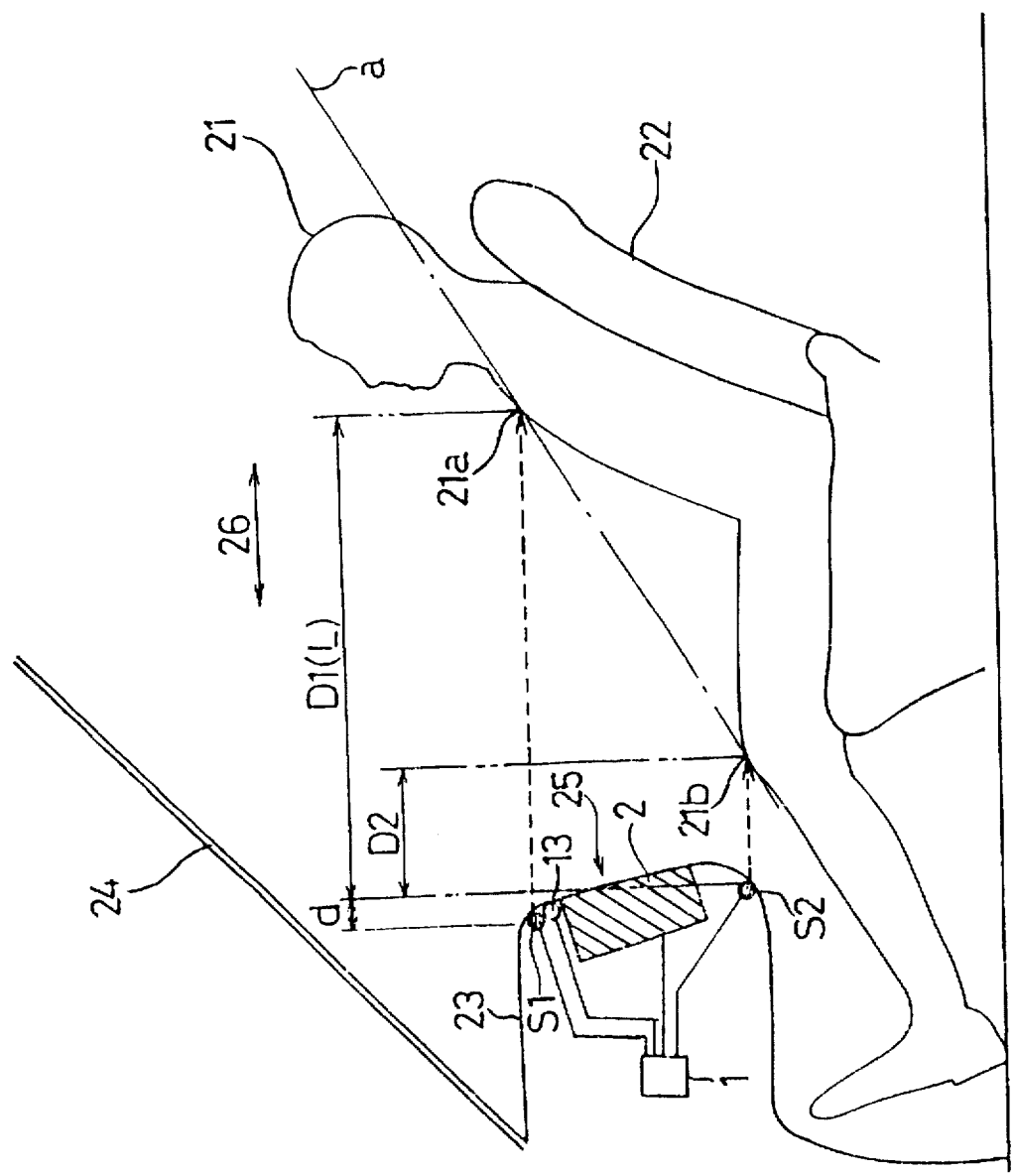
FIG. 1 is a schematic view showing an actuating-judgment system according to a first embodiment of the present invention and illustrating the arrangement of the components of the system near the front passenger seat.
Figure 2:
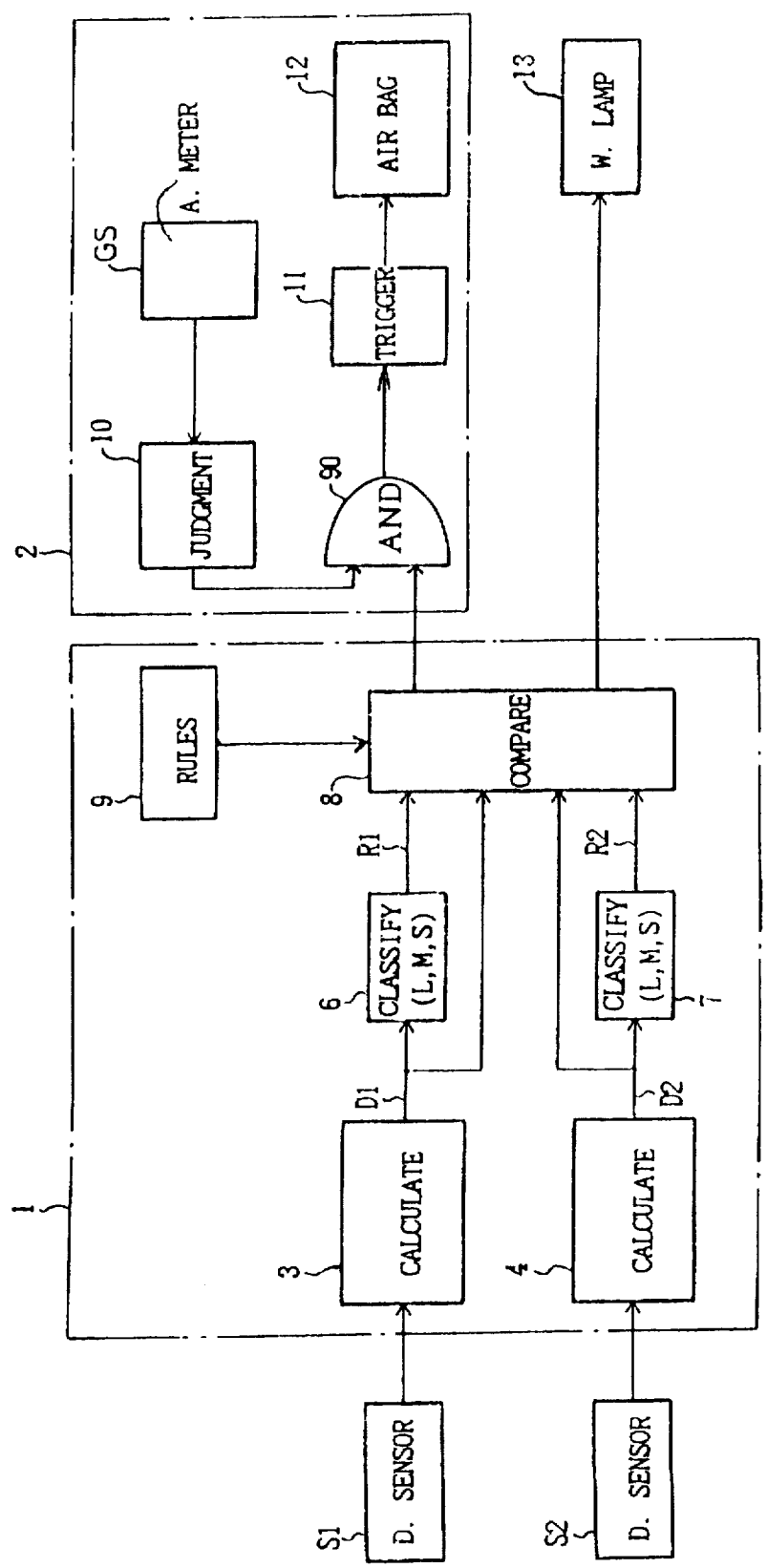
FIG. 2 is a block diagram illustrating the functions of the actuating-judgement system shown in FIG. 1.
Figure 4:
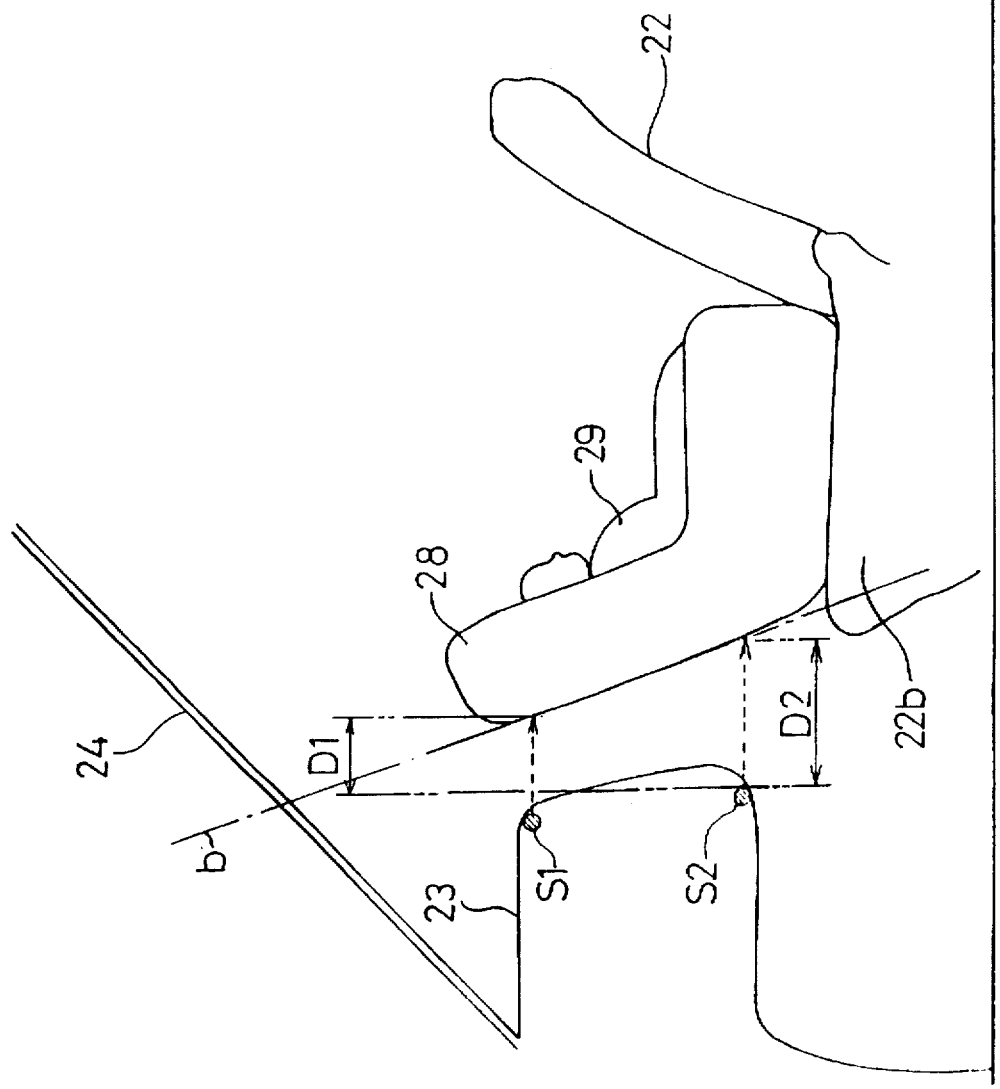
FIG. 4 is a schematic side view showing the present invention similar to FIG. 1, but in which a rearward facing child seat is placed.
Figure 5:
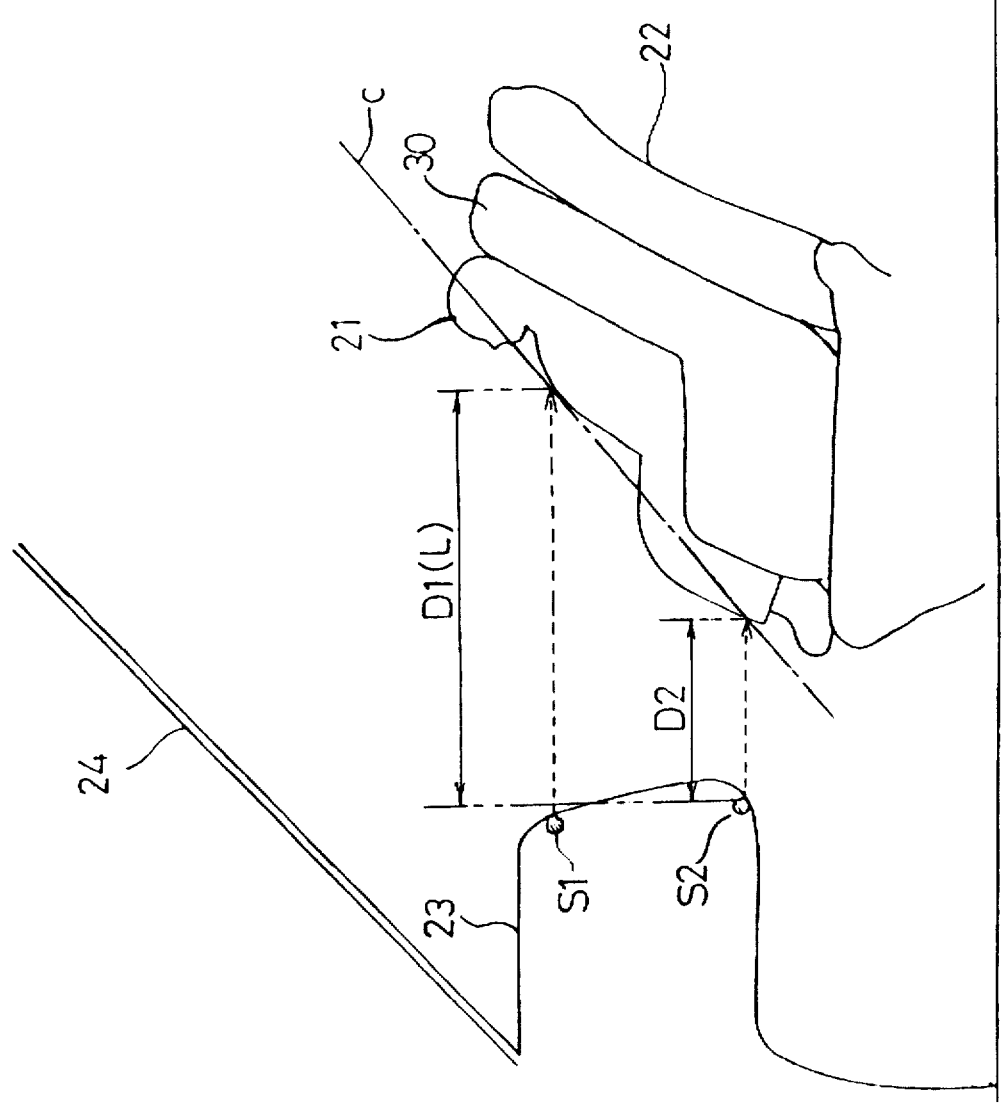
FIG. 5 is a schematic side view showing the present invention similar to FIG. 1, but illustrating the operation of the actuating-judgement system.

FIG. 1 schematically shows the front passenger seat and its vicinities of it in a vehicle, illustrating the arrangement of the components of an actuating-judgement system according to this invention, the judgement system being for use with a safety device for protecting an occupant seated on the front passenger seat. FIG. 2 illustrates the functions of the components of the actuating judgement system. FIG. 3 shows the judgement rules for judgement as to whether it is necessary to permit the actuating judgement system. FIGS. 4 and 5 schematically show vicinities of the passenger seat, illustrating the operation of the actuating-judgement system. FIG. 6 shows the effect of the actuating-judgement system.

This actuating judgement system, forming a first embodiment of the present invention, uses a plurality of distance sensors to identify the shape of an object. A judgement as to whether the safety device for protecting an occupant on the front passenger seat should be actuated is made according to the result of distance sensors.

The configuration of this first embodiment is first described by referring to FIGS. 1 and 2. In FIG. 1, an occupant 21 sits on the front passenger seat 22. The instrument panel and the windshield of the vehicle are indicated by numerals 23 and 24, respectively. An air bag storing portion 25 is formed inside the instrument panel 23 in front of the front passenger seat 22. A safety device 2 for inflating an air bag is mounted in the air bag storing portion 25. Distance sensors S1 and S2 are located above and under the air bag storing portion 25 respectively. A warning lamp 13 is installed at an appropriate position on the front face of instrument panel 23 in front of the front passenger seat 22. The distance sensors S1 and S2 and the warning lamp 13 are connected with a detection-and-judgement circuit 1, which is, in turn, connected with the safety device 2. Ultrasonic sensors or infrared sensors are used as the distance sensors S1 and S2.

Referring to FIG. 2, the output signals from the distance sensors S1 and S2 are applied to the detection-and-judgement circuit 1 which is an arithmetic unit. The detection-and-judgement circuit 1 produces an output signal to the safety device 2 in order to inform whether it is necessary to actuate safety device 2. The detection-and-judgement circuit 1 produces an output signal to the warning lamp 13 to put it on.

The detection-and-judgement circuit 1 has blocks 3 and 4 which calculate the distances D1 and D2 between a reference point and the occupant 21 as shown in FIG. 1 on the basis of distance signals from the distance sensors S1 and S2 respectively. The distances D1 and D2 are taken in the forward and backward direction of the vehicle. These distances D1 and D2 are classified into three classes: long distance L, medium distance M, and short distance S by blocks 6 and 7 respectively. In FIG. 2, the distances D1 and D2 are classified as classes R1 and R2 respectively. In block 8, the distances D1 and D2 taken in the forward and backward direction of a vehicle, their respective classes R1 and R2, and judgement rules are compared. The result of the judgement made by the detection-and-judgement circuit 1 is permission to actuate (◎), permission to actuate with warning (○), or non-permission to actuate with warning (X). The judgement rules have been stored in a memory block 9. The contents are illustrated in FIG. 3. When it is necessary to actuate the air bag system, whether or no with a warning, the detection-and-judgement circuit 1 outputs an actuating permission signal to an AND circuit 90 included in the safety device 2. When it is not necessary to actuate the air bag system, in another words, such a state as non-permits to actuate but warning, the detection-and-judgement circuit 1 outputs an actuating inhibition signal to the AND circuit 90. When it is necessary to issue a warning such a state as permits to actuate with warning or non-permits to actuate but warning, the detection-and-judgement circuit 1 produces an output signal to the warning lamp 13 to put it on.

The safety device 2 includes an accelerometer GS for detects variations in the acceleration when the vehicle is decelerated. According to the acceleration signal from the accelerometer GS, a collision judgement circuit 10 judges as to whether a collision occurs. If the result of the judgement made by the collision judgement circuit 10 is that a collision occurs, then a starting signal is fed to the AND circuit 90. At this time, if the actuating-permission signal from the block 8 of the detection-and-judgement circuit 1 is applied to the AND circuit 90, then the starting signal is produced from the AND circuit 90 to a trigger circuit 11, thus actuating an air bag system 12. On the other hand, if the actuating-inhibition signal from the block 8 of the detection-and-judgement circuit 1 is being supplied to the AND circuit 90, then the starting signal is not delivered from the AND circuit 90 to the trigger circuit 11, provided that the starting signal from the collision judgement circuit 10 is applied to the AND circuit 90. Hence, the air bag system 12 is not actuated.

The operation of the detection-and-judgement circuit 1 described above is next described by referring to FIGS. 1-4. Referring to FIG. 1, if the occupant 21 sits on the front passenger seat 22, the distance sensors S1 and S2 detect the distances to a higher position 21a and a lower position 21b on the occupant 21 respectively. The distance D1 (hereinafter referred to as the upper distance) from the reference position (in the illustrated example, the position where the distance sensor S2 is installed) is determined from the detected distance. Also, the distance D2 (hereinafter referred to as the lower distance) from the reference position is determined from the detected distance. These distances D1 and D2 are taken in the forward and backward direction of the vehicle, indicated by the arrows 26. The distance d between the distance sensors S1 and S2 is used in correcting these distances. The distances D1 and D2 are classified into three classes L, M, or S. Since the distances detected by the distance sensors are corrected according to the installation positions of the sensors in this way, the installation positions are not limited to the positions of the illustrated example. Rather, the installation positions may be appropriately selected. Where ultrasonic sensors are used, ultrasonic transmitters may be spaced from ultrasonic receivers.

Further, a standard used for classifying said distances may be adjusted according to such a position of a passenger seat detected by a seat position sensor.

The judgement rules illustrated in FIG. 3 are described. In FIG. 1 and FIG. 3, if the upper distance D1 is greater than the lower distance D2, i.e., the object or occupant is tilted rearward toward the forward and backward direction of the vehicle, indicated by the arrows 26, then it is assumed that the object is the occupant 21 seated on the front passenger seat. The result of the judgement is that it is necessary to actuate the air bag system. Then, the value of the upper distance D1 is classified into long distance L, medium distance M, or short distance S. Where the upper distance D1 belongs to the short distance S, i.e., the object or passenger is close to the air bag storing portion 25 and located in the inflation-inhibited zone, the air bag system is permitted to actuate with a warning. This means that the air bag system is permitted to actuate but the best result may not be produced. If the upper distance D1 is less than the lower distance D2, i.e., the object is tilted forward in the forward and backward direction of the vehicle, then it is assumed that the seat is a child seat (described later). At this time, the air bag system is not permitted to actuate but a warning is issued.

In FIG. 1, the occupant 21 sits in a normal position. The upper distance D1 is greater than the lower distance D2. The tilt line a is tilted rearward. The upper distance D1 is classified as class L. Accordingly, the detection-and-judgement circuit 1 judges that the air bag system should be permitted to actuate. The detection-and-judgement circuit 1 produces the actuating permission signal to the safety device 2. If a collision subsequently takes place, the air bag is inflated.

Where a rearward facing child seat 28 is mounted on the passenger seat 22, as shown in FIG. 4, the upper distance D1 is less than the lower distance D2, and the tilt line b is tilted forward. Therefore, the detection-and-judgement circuit 1 judges that the air bag system should not be permitted to actuate. The detection-and-judgement circuit 1 then produces the actuating-inhibition signal to the safety device 2. As a result, if a collision occurs, the air bag is not inflated. This assures safety for the infant 29. If the portion 22b of the passenger seat 22 moves, this tilt line b does not change. This ensures that the rearward facing child seat 28 is detected.

FIG. 5 shows a case in which a forward facing child seat 30 is placed on the passenger seat 22. The upper distance D1 is greater than the lower distance D2, and the tilt line c is tilted rearward. The upper distance D1 is classified as class L. Therefore, the detection-and-judgement circuit 1 judges that the air bag system should be permitted to actuate. The detection-and-judgement circuit 1 produces the actuating permission signal to the safety device 2. As a result, if a collision occurs, then the air bag is inflated, thus assuring safety for the occupant 21.

The effects of this actuating judgement system for the safety device under various assumed conditions, including the above-described condition, are described by referring to FIG. 6. In FIG. 6, where an adult sits on the front passenger seat, the upper distance D1 is greater than the lower distance D2, as long as the posture is normal. If the adult is holding baggage or a child in his or her arms, a judgement as to whether it is necessary to permit to actuate the air bag system can be appropriately made. Especially, where the adults holds a large piece of baggage in his or her arms and thus is too close to the instrument panel, i.e., the upper distance D1 is classified as class S, the warning lamp 13 on the instrument panel is lit up to issue a warning, as shown in FIG. 1. The lamp 13 may be lit up variously. For example, the lamp is first made to flicker and then is kept lit up. The warning made by the lamp 13 adequately urges the driver to instruct the passenger to remove the baggage on the passenger's lap. However, as indicated by numerals 42–44, where the passenger assumes an abnormal posture, e.g., he places his legs on the instrument panel, the upper distance D1 is less than the lower distance D2. Accordingly, the detection-and-judgement circuit 1 judges that the air bag system should not be permit to actuate. Hence, an appropriate judgement is not made. However, a warning is given to urge the passenger to return to his normal posture. Then, judgement as to whether the air bag system should be permitted to actuate can be made adequately.

When a child is on the passenger seat, the upper distance D1 is equal to or greater than the lower distance D2, whether the child sits or is standing. Therefore, a judgement as to whether the air bag system should be permitted to actuate can be appropriately made. Especially, when a child is standing on the floor between the instrument panel and the seat, a warning is issued. Then the driver can cause the child to sit on the seat. Hence, the child is prevented from being thrown outward when the air bag is inflated.

Where a child seat is mounted on the front passenger seat, a judgement as to whether it is necessary to permit to actuate the air bag system can be appropriately made as described above. However, if no child sits on a forward facing child seat as indicated by numeral 45, the result of the judgement is that it is necessary to permit to actuate the air bag system, although it is not necessary to inflate the air bag in practice. Therefore, in this case, the novel actuating judgement system for use with the safety device is unable to appropriately make a judgement as to whether it is necessary to permit to actuate the air bag system.

Where no child is on the front passenger seat, it is essentially unnecessary to permit to actuate the air bag system, as indicated by numerals 46 and 47. However, the object, including the front passenger seat, is tilted rearward and so the result of the judgement is that it is necessary to permit to actuate the air bag system. Also in this case, it is impossible in principle for the actuating judgement system for use with the safety device to make an appropriate judgement as to whether it is necessary to actuate the air bag system. It is to be noted that this drawback can be easily compensated for by a combination with other sensors described later.

As described thus far, the actuating judgement system for use with the safety device can appropriately make a judgement as to whether it is necessary to permit to actuate the air bag system under various states of the front passenger seat, except for theoretically unavoidable cases and special cases. Furthermore, since the distance sensors, the detection-and-judgement circuit 1, and so on are disposed near the instrument panel, the cost can be curtailed by integrating the sensors and the circuit 1 with the air bag module.

Figure 7:
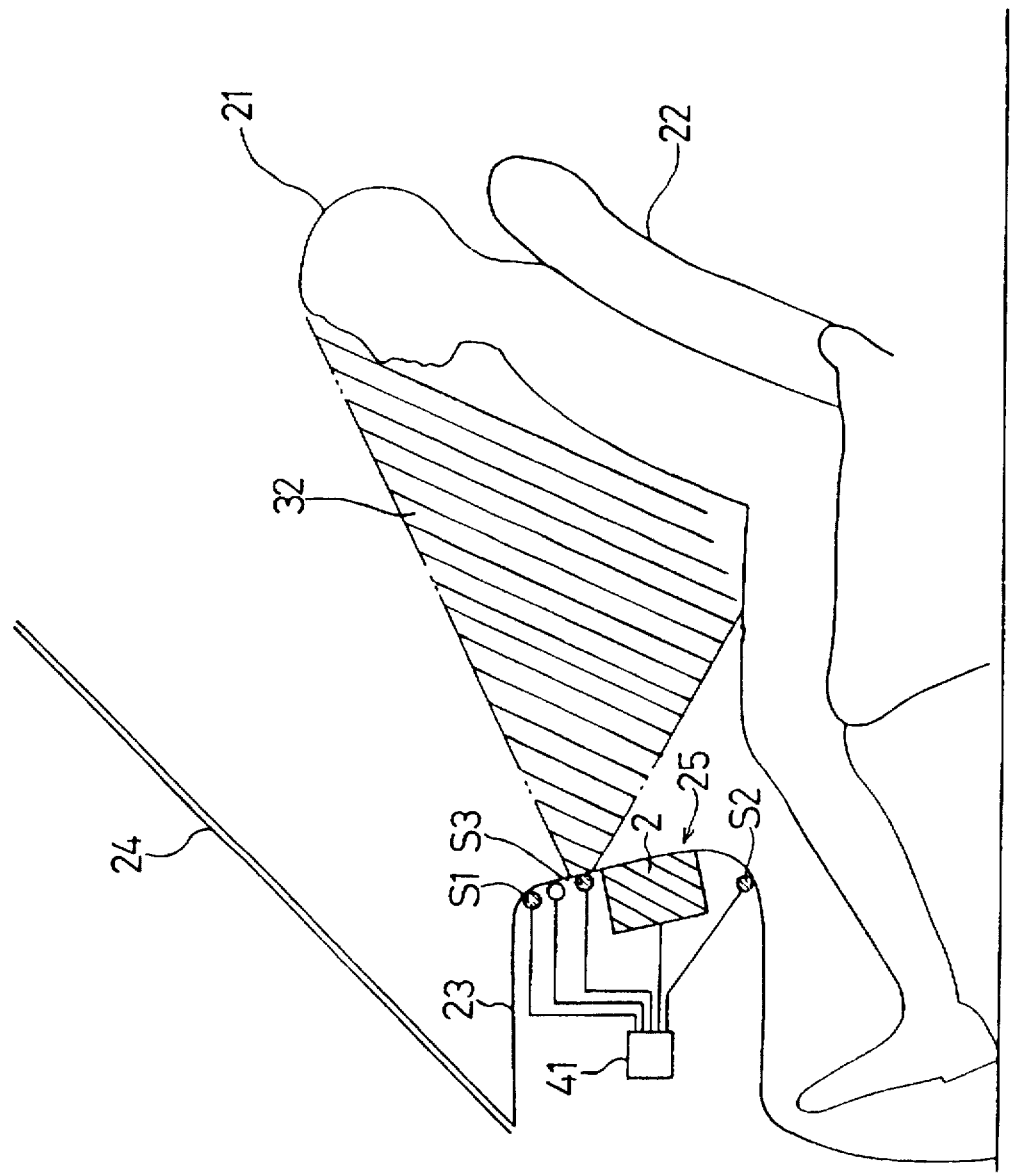
FIG. 7 is a schematic side view showing of an actuating-judgement system according to a second embodiment of the present invention, the system being for use with a safety device for protecting an occupant seated on the front passenger seat of a vehicle, illustrating the arrangement of the components of the system near the front passenger seat.
Figure 8:
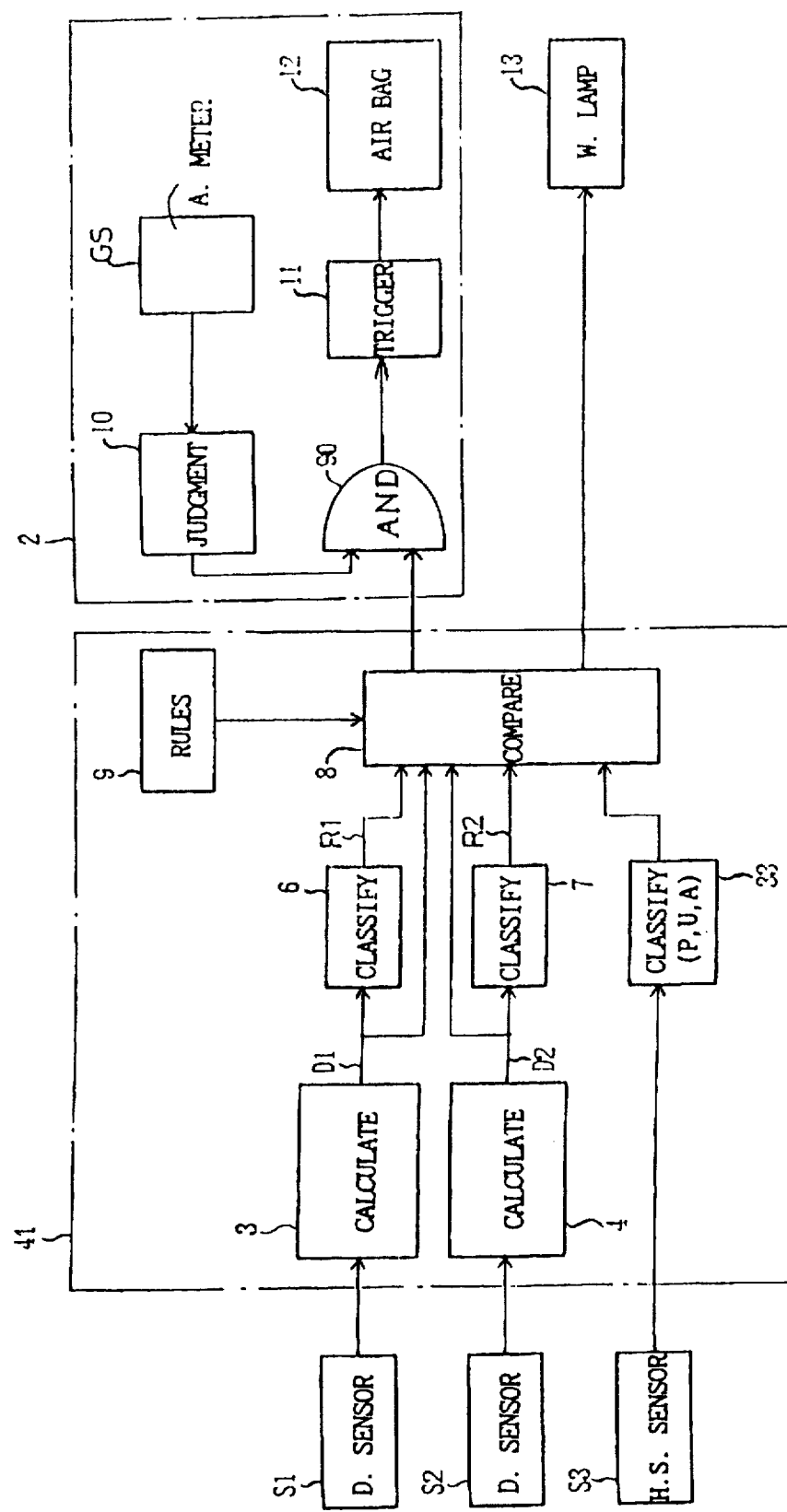
FIG. 8 is a block diagram illustrating the functions of the actuating-judgement system shown in FIG. 7.

Another actuating judgement system for use with a safety device for protecting an occupant on the front passenger seat is described by referring to FIGS. 7–10. In this second embodiment of this invention, distance sensors are combined with a heat source sensor which detects the presence or absence of a heat source to form the actuating judgement system for judgement as to whether it is necessary to permit actuating the safety device. FIG. 7 schematically shows vicinities of the front passenger seat, illustrating the arrangement of the components. FIG. 8 shows the functions of the actuating judgement system for use with the safety device. FIG. 9 shows the judgement rules for judgement as to whether it is necessary to permit actuating the safety device. FIG. 10 shows the effects of the actuating judgement system for use with the safety device.

The structure of this actuating judgement system is described by referring to FIGS. 7 and 8. The structure shown in FIG. 7 is similar to the structure shown in FIG. 1 except that a heat source sensor S3 is mounted near the air bag storing portion 25 and connected with a detection-and-judgement circuit 41. This heat source sensor S3 has a detection region 32 spreading toward the front passenger seat 22, and detects the presence or absence of a heat source existing in the space extending from the air bag storing portion 25 to the passenger seat 22. An infrared sensor equipped with a chopper is used as the heat source sensor S3.

The configuration shown in FIG. 8 is similar to the configuration shown in FIG. 2 except that a block 33 for classifying the input signal from the heat source sensor S3 is incorporated in the detection-and-judgement circuit 41. This block 33 classifies the input signal coming from the heat source sensor S3 into three classes. In the first class (P), a heat source is present. In the second class (U), it is impossible to judge. In the third class (A), no heat source is present. The output signal from this block 33 is applied to comparison-and-judgement block 8. In the block 8, the input signal from the block 33 is added to the input signal shown in FIG. 2. The sum signal is compared with the judgement rules, and a judgement as to whether it is necessary to permit actuating the air bag system or as to whether it is necessary to give a warning is made. The judgment rules are stored in the block 9. The contents are illustrated in FIG. 9.

The judgement rules are described by referring to FIG. 9. Where no heat source is present (case A), the actuating-judgement system for the safety device judges that no person is present and determines that the air bag system is not permitted to actuate but a warning is issued. Where it is impossible to judge whether any heat source is present or absent (case U), the actuating-judgement system obeys the result of judgement made by the distance sensors. Where a heat source is present (case P), the actuating-judgement system judges that the air bag system is permitted to actuate. If the upper distance D1 is greater than the lower distance D2, i.e., the object is tilted rearward, priority is given to the result of judgement made by the distance sensors. Where any heat source is present (case P), if the upper distance D1 is less than the lower distance D2, i.e., the object is tilted forward, priority is given to the result of judgement made by the heat source sensor. Then the actuating-judgement system determines that the air bag system is permitted to actuate with a warning.

The effects of the present embodiment are next described by referring to FIG. 10. Where an adult places his legs on the instrument panel (cases 42–44), it is impossible to make an appropriate judgement in the first embodiment described already in connection with FIG. 6. In this second embodiment, the actuating-judgment system judges that it is necessary to permit actuating the air bag system with a warning, as long as the heat source sensor S3 is capable of detecting generation of heat. Where no person is present on the passenger seat (cases 45–47), it is impossible to make an appropriate judgement in the first embodiment as given in FIG. 6. In the second embodiment, the heat sensor S3 does not detect any heat source and so the actuating judgement system appropriately judges that it is unnecessary to permit actuating the air bag system.

In the present second embodiment, two distance sensors are combined with one heat source sensor. It is also possible to combine one distance sensor with a heat source sensor. For example, a judgement as to whether any object is present within the air bag inflation-inhibited zone is made, using the distance sensor. The heat source sensor is used to judge as to whether the object is generating heat, in order to judge whether the object is a human body. As a result, it is possible to make an appropriate judgement as to whether it is necessary to permit actuating the air bag system. Where the heat source sensor and the distance sensor are combined in this way, it is possible to judge whether the object is present in the dangerous zone, from the distance to the object. Furthermore, it is possible to judge whether it is not necessary to permit actuating the air bag system, from the shape of the object. In addition, it is possible to judge whether the object is a human body, from the presence or absence of heat from the object. Consequently, it is possible to make a more appropriate judgement as to whether the air bag system should be permitted to actuate.

Figure 11:
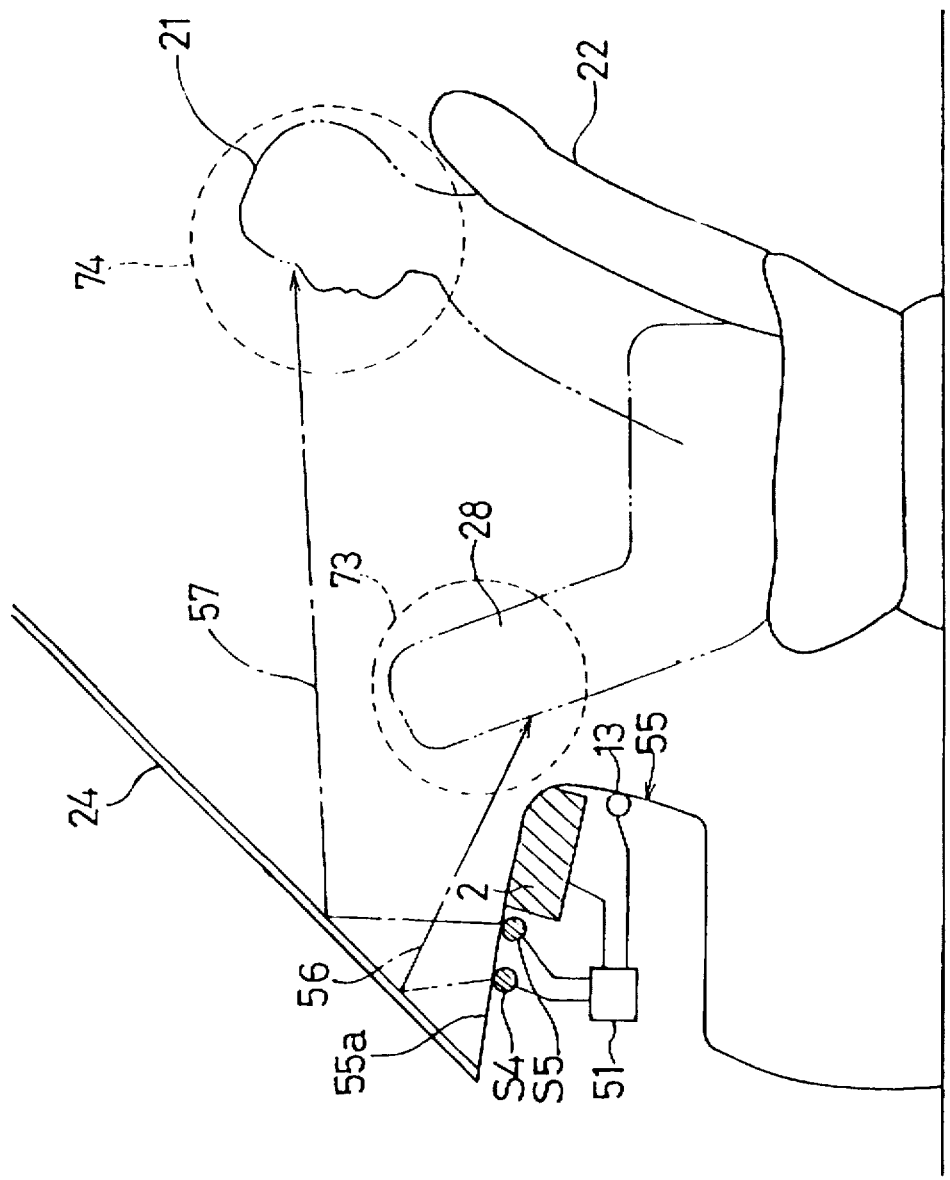
FIG. 11 is a schematic side view showing of an actuating-judgement system according to a third embodiment of the present invention, the system being for use with a safety device for protecting an occupant seated on the front passenger seat of a vehicle, illustrating the arrangement of the components of the system near the front passenger seat.
Figure 12:
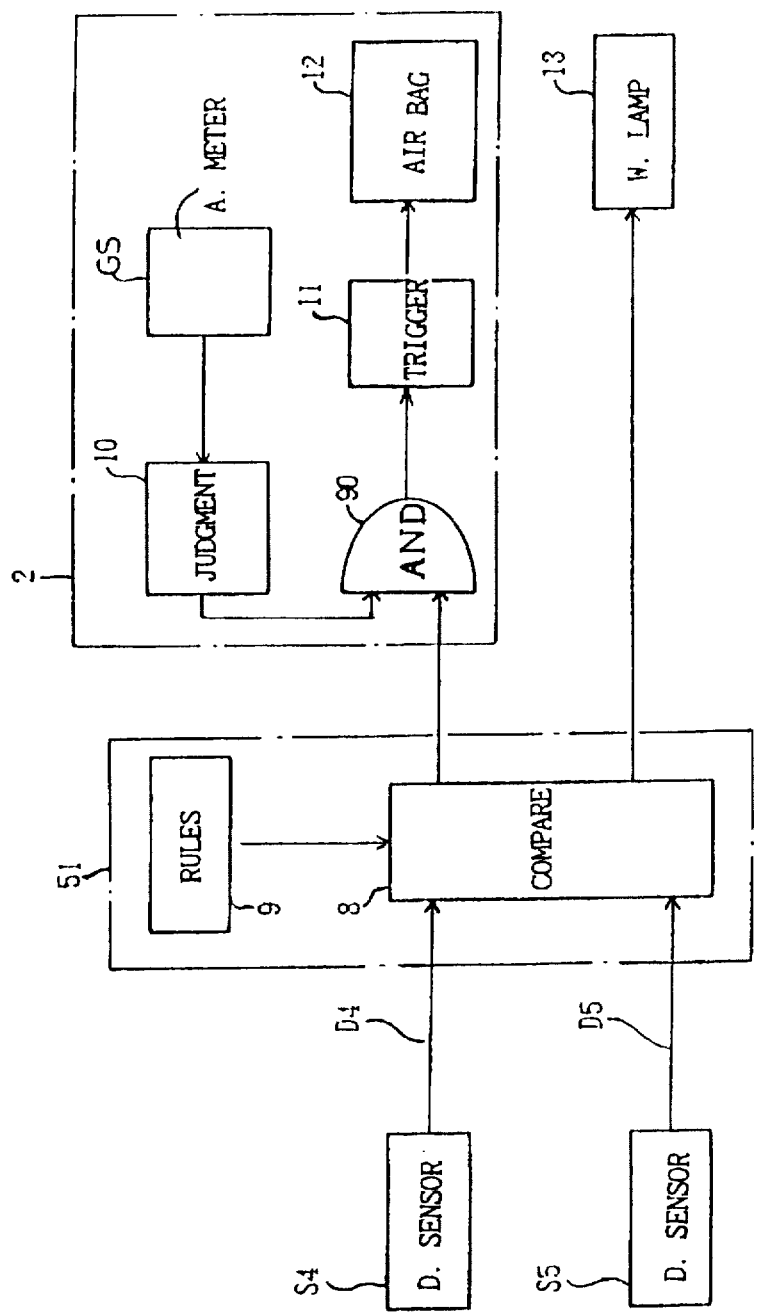
FIG. 12 is a block diagram illustrating the functions of the actuating judgement system shown in FIG. 11.

A further actuating-judgement system for use with a safety device is next described by referring to FIGS. 11, 12 and FIG. 13. This actuating-judgement system forms a third embodiment of the invention. In this embodiment, the presence or absence of an object in a certain location is detected with two distance sensors. According to the result, a judgement is made as to whether it is necessary to permit actuating the air bag system. FIG. 11 schematically shows the vicinities of the front passenger seat, illustrating the arrangement of the components of the third embodiment. FIG. 12 shows the functions of the components. FIG. 13 shows the judgement rules for judgement as to whether it is necessary to permit actuating the safety device. It is to be noted that like components are indicated by like reference numerals in various figures and that those components which have been already described will not be described below.

First, the structure is described by referring to FIGS. 11 and 12. In FIG. 11, the safety device 2 for inflating the air bag is mounted on the top surface 55a of the instrument panel 55. A first distance sensor S4 and a second distance sensor S5 are installed close to the safety device 2. The warning lamp 13 is mounted on the front face of the instrument panel in front of the passenger seat. Each of the distance sensors S4 and S5 is an ultrasonic sensor composed of a wave transmitter and receiver. The two distance sensors S4 and S5 are connected with a detection-and-judgement circuit 51. This detection-and-judgement circuit 51 is connected with the warning lamp 13 and also with the safety device 2 for inflating the air bag. The distance sensors S4 and S5 transmit and receive ultrasonic waves 56 and 57 to and from the first detection region 73 and the second detection region 74, by making use of reflection at the windshield 24. This first detection region 73 is established, assuming that the rearward facing child seat 28 is mounted. The first detection region 73 is established at the top of the rearward facing child seat 28. If any object exists within this detection region 73, and if the safety device 2 is permitted to actuate the air bag system, then a danger would be created. Hence, actuation of the air bag system is inhibited if any object is present in this detection region 73.

The second detection region 74 is established on the assumption that the occupant 21 normally sits. The second detection region 74 is established at the top of the occupant 21. If any object or human body exists within this second detection region 74, the safety device 2 is caused to permit actuating the air bag system to protect the occupant. The reflection of the ultrasonic waves 56 and 57 may utilize side windows. Where reflection is employed in this way, the back of an obstacle can be detected. Furthermore, insensitive distances, or too short distances, for the ultrasonic sensors can be avoided in using them.

Referring to FIG. 12, the distance sensor S4 produces an output signal D4 indicating a first distance. The distance sensor S5 produces an output signal D5 indicating a second distance. These two signals D4 and D5 are applied to the block 8. In the block 8, the signals D4 and D5 are compared with the judgement rules. Thus, the judgement is made as to whether it is necessary to permit actuating the air bag system. Also, the judgement is made as to whether it is necessary to issue a warning. The judgement rules are stored in the block 9 of the detection-and-judgement circuit 51. The judgement rules are now described by referring to FIG. 13. T1 and T2 are the lower and upper threshold values, respectively, of the first distance D4. T3 and T4 are the lower and upper threshold values, respectively, of the second distance D5. If the distance to the object is within the limits of these upper and lower threshold values, then the object is judged to lie within the detected region. If an occupant or object is absent in the second detection region, the air bag is not permitted to inflate, irrespective of whether an object such as a child seat is present in the first detection region. If an object such as an occupant is present in the second detected region, and if any object such as a child seat does not exist in the first detection region, then the actuating-judgement system judges that the air bag should be permitted to inflate. If any object such as an occupant exists in the second detected region, and if any object such as a child seat is present in the first detected region, then the system judges that the air bag should be permitted to inflate with a warning.

The operation is next described by referring to FIG. 11. Where the occupant 21 sits in the normal position, the first distance sensor S4 detects no object within the first detection region 73. The second distance sensor S5 detects an object within the second detection region 74. Therefore, the safety device 2 is allowed to inflate the air bag. Where the rearward facing child seat 28 is mounted, the first distance sensor S4 detects an object within the first detection region 73. The second distance sensor S5 detects no object within the second detection region 74. Therefore, the safety device 2 is not permitted to inflate the air bag. If a large piece of baggage (not shown) is placed on the knees of the occupant 21, then the first distance sensor S4 and the second distance sensor S5 detect objects within the first detection region 73 and within the second detection region 74. Consequently, the safety device 2 is enabled to inflate the air bag. The warning lamp 13 is made to issue a warning. Then, the occupant 21 takes appropriate measures. In this third embodiment, the rearward facing child seat 28 can be detected. Furthermore, absence of a person on the front passenger seat can be detected. As a result, it is possible to make an appropriate judgement as to whether it is necessary to permit actuating the air bag system. Additionally, the distance sensors are installed on the top surface of the instrument panel, thus preventing the interior of the vehicle from becoming disfigured.

Figure 14:
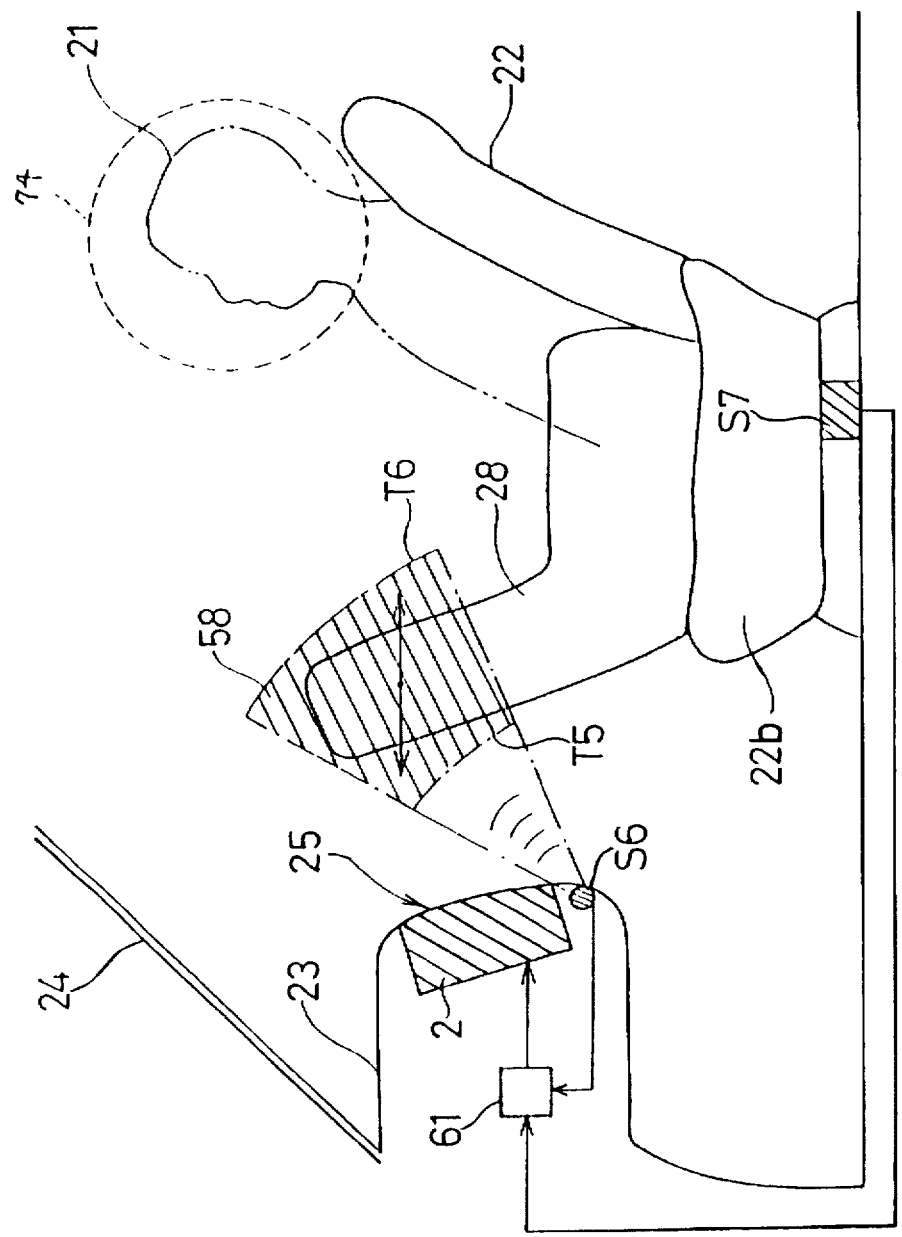
FIG. 14 is a schematic side view showing of an actuating-judgement system according to a fourth embodiment of the present invention, the system being for use with a safety device for protecting an occupant seated on the front passenger seat of a vehicle, illustrating the arrangement of the components of the system near the front passenger seat.
Figure 15:
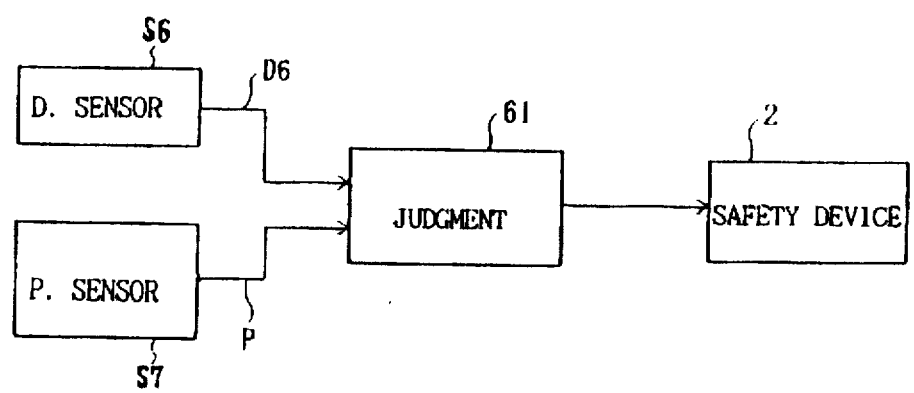
FIG. 15 is a block diagram illustrating the functions of the actuating-judgement system shown in FIG. 14.
Figure 16:
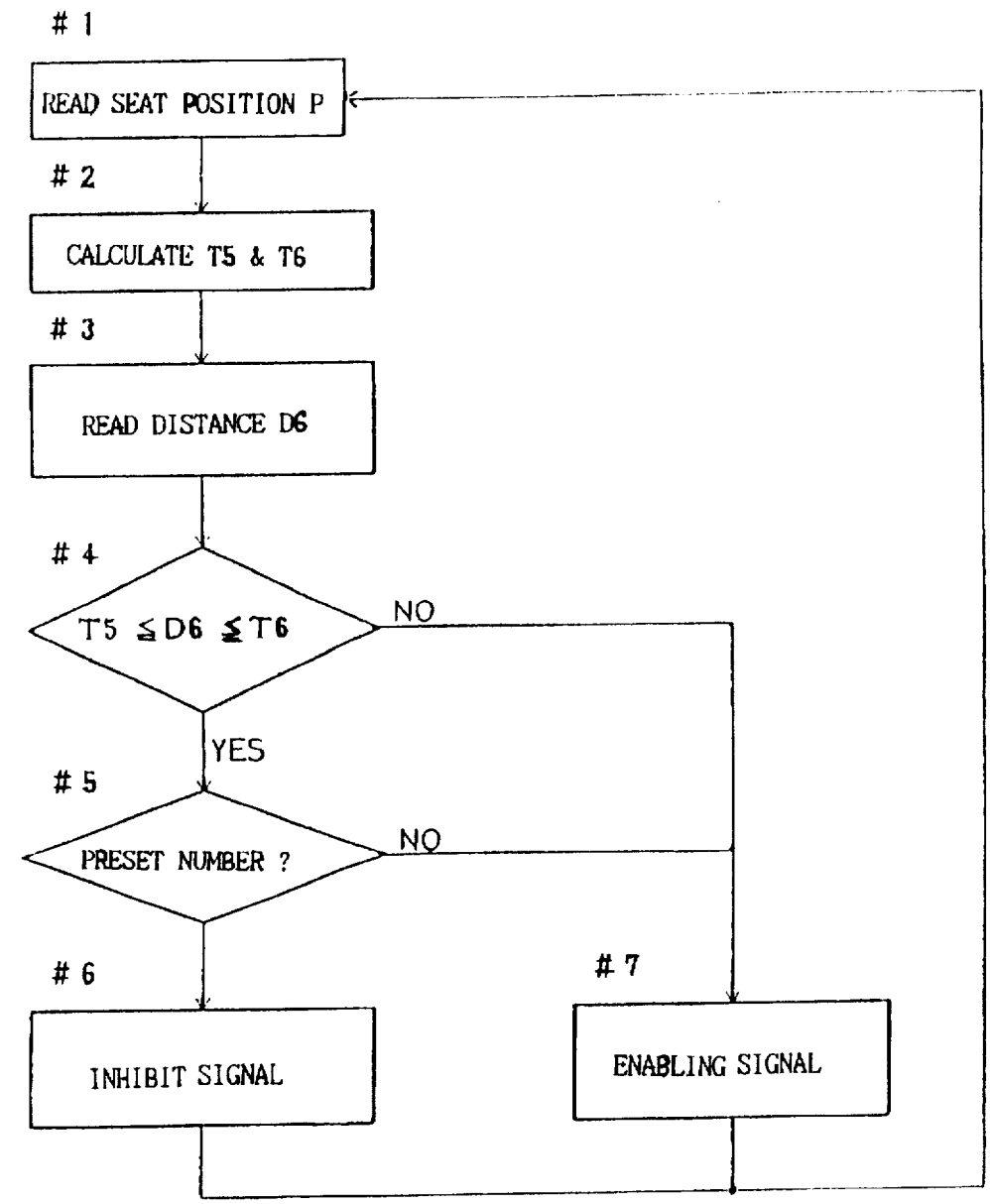
FIG. 16 is a flowchart illustrating the operation of the actuating-judgement system shown in FIG. 14.

A still other actuating judgement system for use with the safety device for protecting an occupant on the front passenger seat is next described by referring to FIGS. 14–16. This actuating judgement system forms a fourth embodiment of the present invention. In this embodiment, a distance sensor and a seat position sensor are combined to judge as to whether it is necessary to permit actuating the safety device. FIG. 14 schematically shows the vicinities of the front passenger seat, illustrating the arrangement of the components of the fourth embodiment. FIG. 15 illustrates the functions of the components. FIG. 16 is a flowchart illustrating the operation. It is to be noted that like components are denoted by like reference numerals in various figures and those components which have been already described will not be described below.

The configuration is first described by referring to FIG. 14. The safety device 2 and a distance sensor S6 are installed inside the front face of the instrument panel 23. A position sensor S7 is located under the front passenger seat 22, and acts to detect the position of the seat portion 22b. These sensors are connected to a detection-and-judgement circuit 61. A detection region 58 is established above the rearward facing child seat 28 for the distance sensor S6. This detection region 58 means an inflation-inhibited zone, in the same way as in FIG. 11. T5 and T6 are the lower and upper threshold values, respectively, of the distance from the distance sensor S6. The threshold values T5 and T6 can be regarded as the distance from the air bag storing portion 25. In FIG. 15, an output signal D6 from the distance sensor S6 and an output signal P from the seat position sensor S7 are fed to the detection-and-judgement circuit 61. The detection-and-judgement circuit 61 produces an output signal to the safety device 2 so that it is permitted to actuate or not.

The operation of this detection-and-judgement circuit 61 is next described by referring to the flowchart of FIG. 16. The position P of the seat is read (step 1). The lower threshold value T5 and the upper threshold value T6 are calculated from this read seat position P (step 2). These threshold values T5 and T6 vary according to movement of the seat position P in the forward and backward direction of the vehicle. In particular, where the seat position P is located in a backward position, the threshold values T5 and T6 increase. Where the seat position P is located in a forward position, the threshold values decrease. Then, the distance D6 from the air bag storing portion is read (step 3). A judgement is made as to whether this distance D6 lies within the ranges of the threshold values T5 and T6 (step 4). If the distance is outside the ranges, i.e., no object exists in the inhibited zone, an actuating-permission signal is output to the safety device. Thus, inflation of the air bag is permitted (step 7). If the distance lies within the ranges, i.e., an object exists in the inhibited zone, then a judgement is made as to whether this detection is repeated a preset number of times (step 5). If the preset number is not reached, e.g., when the occupant temporarily approaches the instrument panel, control goes to step 7. Then, an actuating-permission signal is delivered to the safety device. If this series of operations is repeated a given number of times, i.e., the rearward facing child seat 28 is mounted, an actuating-inhibition signal is produced to the safety device. As a consequence, inflation of the air bag is inhibited (step 6). This judgement as to whether this series of operations is repeated is not limited to the present embodiment. Rather, this judgement is made in all other embodiments. Temporary operation is not taken into consideration in making the judgement as to whether it is necessary to permit actuating the air bag system.

In FIG. 14, as the front passenger seat 22 is moved, the detection region for the distance sensor S6 is moved. Therefore, it is possible to make a more accurate judgement as to whether it is necessary to permit inflating the air bag. In the above description, the inhibited zone is the detection region for the distance sensor S6. However, in the same way as the scheme described in connection with FIG. 11, the inflation-permitted zone 74 can be taken as the detection region for the distance sensor S6, and the result of the detection is used in making a judgement as to whether it is necessary to permit inflating the air bag. Also in this case, the accuracy with which the judgement as to whether it is necessary to permit actuating the air bag system can be enhanced. For example, a judgement as to whether no person is present on the front passenger seat can be made with greater reliability. Therefore, as can be seen from this description, the accuracy of the judgement as to whether it is necessary to permit actuating the air bag system can be improved by combining the fourth embodiment with the third embodiment illustrated in FIG. 11. Also in this embodiment, a warning can be issued at the same time.

Figure 17:
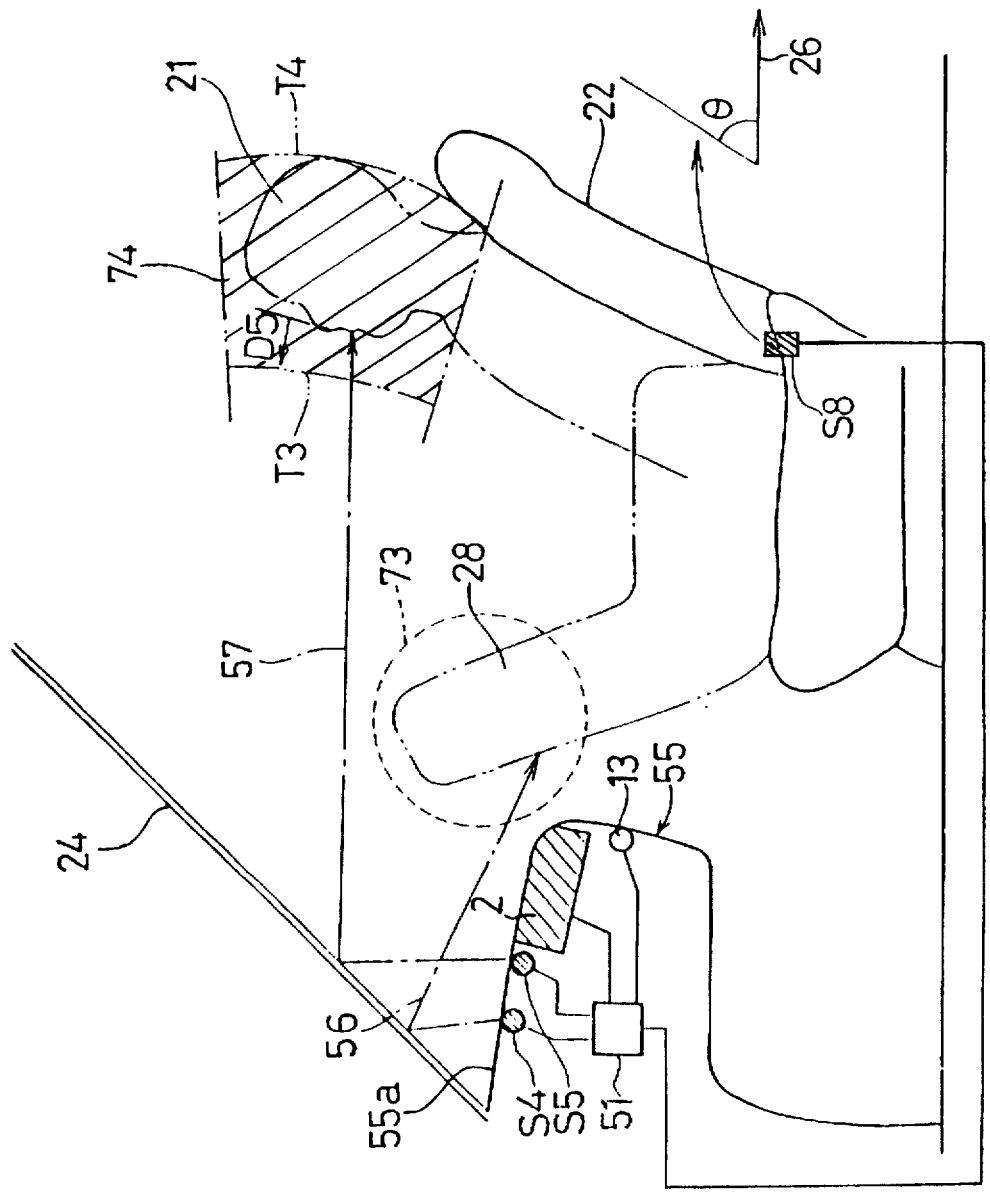
FIG. 17 is a schematic side view showing of an actuating-judgement system according to a fifth embodiment of the present invention, the system being for use with a safety device for protecting an occupant seated on the front passenger seat of a vehicle, illustrating the arrangement of the components of the system near the front passenger seat.

A yet other actuating-judgement system for use with the safety device for protecting an occupant on the front passenger seat is next described by referring to FIG. 17. This actuating-judgement system forms a fifth embodiment of the present invention. In this embodiment, a distance sensor and a seat angular position sensor are combined, and a judgement is made as to whether it is necessary to permit actuating the safety device. FIG. 17 schematically shows vicinities of the passenger seat, illustrating the arrangement of the components of the fifth embodiment.

The configuration of FIG. 17 is similar to the configuration of FIG. 11 except that a seat angular position detection sensor S8 is mounted at the base of the back of the front passenger seat 22 and connected with the detection-and-judgement circuit 51. The angular position detection sensor 8 detects the angle θ of the back of the passenger seat with respect to the forward and backward direction of the vehicle, indicated by the arrow 26.

Functions regarding processing of the output signal from the seat angular position detection sensor S8 are the same as the functions illustrated in FIG. 15. The operation is the same as the operation illustrated in the flowchart of FIG. 16. In FIG. 17, the lower threshold value T3 and the upper threshold value T4 of the second distance D5 in the inflation-permitted zone 74 are varied according to the angle θ of the back of the front passenger seat 22. That is, as the angle θ is reduced, the threshold values T3 and T4 are increased. Conversely, as the angle θ is increased, these threshold values are reduced. Therefore, the second detection region 74 moves with the angle of the back of the front passenger seat. Hence, in the judgement rules as shown in FIG. 13, the accuracy of the judgement made as to whether it is necessary to permit actuating the air bag system especially regarding the second detection region can be enhanced. For instance, a judgement made as to whether no one is present on the passenger seat 22 can be made more reliable.

In addition, as can be seen from the description provided thus far, a combination of the present embodiment and the fourth embodiment, i.e., a combination of a distance sensor, a seat position sensor, and a seat angular position sensor, improves the accuracy of a judgement made as to whether it is necessary to permit inflating the air bag.

In the above embodiments, plural distance sensors or one distance sensor is combined with another sensor. This makes it possible to make a judgement in more varied cases as to whether the safety device should be permitted to actuate. However, the present invention is not limited to this scheme. For example, one distance sensor is used, and the air bag is not permitted to inflate if the distance from the air bag storing portion is less than a given threshold value. In this case, a danger which would normally be created by inflating the air bag can be circumvented where a rearward facing child seat is mounted or a child is standing, and yet the minimum requirement can be satisfied.

In any of the above embodiments, the actuating-judgment system is connected only to the safety device for permitting to actuate the air bag system to protect an occupant. If the actuating-judgement system is also connected with a means for permitting to actuate the pre-tensioner for the seat belt at the front passenger seat, this pre-tensioner for the seat belt can be permitted to actuate according to the result of a judgement made as to whether it is necessary to permit actuating the safety device.

In particular, where the result of the judgement is that it is necessary to permit inflating the air bag, an actuating permission signal is produced to the means for permitting to actuate the pre-tensioner, thus operating it.

Industrial Applicability

In the actuating-judgment system for use with a safety device for protecting an occupant seated on the front passenger seat, one or more distance sensors are used to detect the distance to an object existing in the space extending from the air bag storing portion to the front passenger seat. According to the detected distance, a judgement is made as to whether it is necessary to permit actuating the safety device. Therefore, it is possible to sense whether any object is present in an inhibited zone or permitted zone. Also, its shape can be detected. As a result, a rearward facing child seat can be detected. Furthermore, in many cases, it is possible to make a precise judgement as to whether it is necessary to permit actuating the safety device.

What is claimed is:

1. An actuating-judgement system for use with a safety device mounted upon a vehicle having a front passenger seat, said safety device having an air bag storing portion holding an air bag therein, said air bag storing portion being located in front of said front passenger seat, said safety device being designed to inflate the air bag upon rapid deceleration of said vehicle, said actuating-judgement system comprising:

at least two distance sensors for detecting signals indicative of distances to an object existing in a certain position within a space extending from said air bag storing portion to said front passenger seat, wherein at least one of said distance sensors is positioned to detect a signal resulting from, and makes use of, a reflection at a windshield or side window which results in a change in direction of detection; and judgement means for judgement as to whether distances determined by said distance sensors are within ranges of given threshold values, respectively, and for determining whether said safety device should be permitted to actuate from results of the judgement.

2. An actuating-judgement system for a safety device mounted upon a vehicle having a front passenger seat, said safety device having an air bag storing portion holding an air bag therein, said air bag storing portion being located in front of said front passenger seat, said safety device being designed to inflate the air bag upon rapid deceleration of said vehicle, said actuating-judgement system comprising:

one distance sensor for detecting a signal indicative of a distance to a portion of an object existing in a space between said air bag storing portion and said passenger seat, wherein said sensor is positioned to detect, and make use of, a signal resulting from a reflection at a windshield or side window which results in a change in direction of detection; and judgement means for judgement as to whether a distance determined by said distance sensor is within a range of given threshold values and for determining whether said safety device should be permitted to actuate from result of the judgement.

3. An actuating judgement system for a safety device mounted upon a vehicle having a front passenger seat, said safety device having an air bag storing portion holding an air bag therein, said air bag storing portion being located in front of said front passenger seat, said safety device being designed to inflate the air bag upon rapid deceleration of said vehicle, said actuating judgement system comprising:

at least two distance sensors including a first distance sensor and a second distance sensor, said at least two distance sensors being designed to detect distances from a given reference point to portions of an object which differ in height, said object existing in a space between said air bag storing portion and said front passenger seat;

a judgement means for judgement according to the distances detected by said distance sensors concerning operation of said safety device;

said first distance sensor being designed to measure a first distance to an upper portion of said object;

said second distance sensor being designed to measure a second distance to a lower portion of said object, said second distance assuming a different value according to whether an occupant sits upon said front passenger seat, a child seat is mounted upon said front passenger seat, or nothing is present upon said passenger seat; and said judgement means acting to judge tilt of said object toward one of a forward and backward direction of said vehicle on the basis of said first and second distances, to classify said first distance into one of plural classes, and to judge regarding actuating said safety device according to the class to which said first distance belongs and according to a direction of said tilt.

4. The actuating judgement system of claim 3, wherein there is further provided a warning means for issuing a warning according to a result of said judgement made by said judgement means regarding actuating said safety device according to the class to which said first distance belongs and according to the direction of said tilt.

5. The actuating judgement system of claim 4, wherein said first distance (D1) is classified into one of three classes: long distance (L), medium distance (M), and short distance (S), and wherein the judgement regarding actuating said safety device is made depending upon the class to which said first distance belongs, upon said first distance (D1) and said second distance (D2), and upon the following judgement rules:

|         | D1 ≧ D2 | |
| --- | --- | --- |
| D1 < D2 | D1 = S | D1 = L or M |
| X | O | ⊙ |

L: long distance;
M: medium distance;
S: short distance;
⊙ permission to actuate
O permission to actuate with warning
X non-permission to actuate but warning 6. The actuating judgement system of claim 3, wherein there is further provided a heat source sensor for detecting presence or absence of heat from said object existing in the space between said air bag storing portion and said front passenger seat, and wherein said judgement regarding actuating said safety device is made depending upon an output signal from said heat source sensor and also upon said first and second distances.

7. The actuating judgement system of claim 6, wherein
(a) said first distance (D1) is classified into one of three classes: long distance (L), medium distance (M), and short distance (S),
(b) a result of the judgement made depending upon the output signal from said heat source sensor is classified into one of three classes: presence of a heat source (P), no heat source (A), and inability to judge (U), and
(c) the judgement regarding actuating of said safety device is made depending upon whether the heat source is present or not, upon the class to which said first distance (D1) belongs, upon said first distance (D1) and said second distance (D2), and upon the following judgement rules:

| | distance | | |
| --- | --- | --- | --- |
| [infrared] heat | | D1 ≧ D2 | |
| source sensor | D1 < D2 | D1 = S | D1 = L, M |
| P | O | O | ⊙ |
| U | X | O | ⊙ |
| A | X | X | X |

L: long distance;
M: medium distance;
S: short distance;
P: presence of a heat source;
U: inability to judge;
A: no heat source;
⊙: permission to actuate
O: permission to actuate with warning
X: non-permission to actuate but warning 8. An actuating judgement system for a safety device mounted upon a vehicle having a front passenger seat, said safety device having an air bag storing portion holding an air bag therein, said air bag storing portion being located in front of said front passenger seat, said safety device being designed to inflate the air bag upon rapid deceleration of said vehicle, said actuating-judgement system comprising:

at least two distance sensors including a first distance sensor and a second distance sensor, said at least two distance sensors being designed to detect distances from a given reference point to portions of an object which differ in height, said object existing in a space between said air bag storing portion and said front passenger seat;

a judgement means for judgement according to the distances detected by said distance sensors concerning operation of said safety device;

a position sensor for detecting a position of said passenger seat;

said first distance sensor being designed to measure a first distance to an upper portion of said object;

said second distance sensor being designed to measure a second distance to a lower portion of said object, said second distance assuming a different value according to whether an occupant sits upon said front passenger seat, a child seat is mounted upon said front passenger seat, or nothing is present upon said front passenger seat; and said judgement means acting to judge tilt of said object toward one of a forward and backward direction of said vehicle on the basis of said first and second distances, to classify said first distance into one of plural classes, to judge regarding actuating said safety device according to the class to which said first distance belongs and according to a direction of said tilt, and to vary a standard used for classifying said first distance into one of plural classes.

9. The actuating judgement system of claim 8, wherein at least one of said distance sensors is positioned to detect a signal resulting from a reflection which produces a change in direction of detection.

10. The actuating judgement system of claim 9, wherein said at least one of said distance sensors makes use of reflection at a windshield or side window, said reflection resulting in a change in direction of detection.

11. An actuating judgement system for a safety device mounted upon a vehicle having a front passenger seat, said safety device having an air bag storing portion holding an air bag therein, said air bag storing portion being located in front of said front passenger seat, said safety device being designed to inflate the air bag upon rapid deceleration of said vehicle, said actuating judgement system comprising:

a first distance sensor for detecting a first distance (D4) to a lower object existing in a space between said air bag storing portion and said front passenger seat;

a second distance sensor for detecting a second distance (D5) to an upper object existing in the space between said air bag storing portion and said front passenger seat;

a judgement means for first judgement as to whether distances detected by said distance sensors are within ranges of given threshold values (T1, T2, T3, T4), respectively, and for second judgement whether said safety device should be permitted to actuate from results of the first judgement according to judgement rules given in the following Table; and a warning means for issuing a warning according to results of said second judgement:

| | first distance | |
|---|---|---|
| second distance | (no object) $D4 < T1, D4 > T2$ | (object present) $T1 \leq D4 \leq T2$ |
| (no-object) $D5 < T3, D5 > T4$ | XX | XX |
| (object present) $T3 \leq D5 \leq T4$ | ⊙ | ○ |

T1: lower threshold value of D4
T2: upper threshold value of D4
T3: lower threshold value of D5
T4: upper threshold value of D5
⊙: permission to actuate

| | first distance | |
|---|---|---|
| second distance | (no object) $D4 < T1, D4 > T2$ | (object present) $T1 \leq D4 \leq T2$ |

○: permission to actuate with warning
XX: non-permission to actuate but warning

12. The actuating judgement system of claim 2, wherein a position sensor for detecting a position of said front passenger seat is mounted at said front passenger seat, and wherein said judgement means varies the ranges of said threshold values according to the position detected by said position sensor.

13. An air bag actuating system comprising:

a first sensor for sensing a first distance to an upper portion of an object existing in a space between an air bag storing portion and a passenger seat, a second sensor for sensing a second distance to a lower portion of said object, and a control unit for determining whether said object is tilted forward or rearward based upon said first and second distances and for controlling actuation of an air bag.

14. An air bag actuating system comprising:

a first sensor for sensing a first distance to a lower object existing in a space between an air bag storing portion and a passenger seat, a second sensor for sensing a second distance to an upper object existing in said space between said air bag storing portion and said passenger seat, and a control unit for controlling deployment of an air bag based upon a criteria given in a table below:

| | first distance | |
|---|---|---|
| second distance | (no object) $D4 < T1, D4 > T2$ | (object present) $T1 \leq D4 \leq T2$ |
| (no-object) $D5 < T3, D5 > T4$ | XX | XX |
| (object present) $T3 \leq D5 \leq T4$ | ⊙ | ○ |

T1: lower threshold value of D4
T2: upper threshold value of D4
T3: lower threshold value of D5
T4: upper threshold value of D5
⊙: permission to actuate
○: permission to actuate with warning
XX: non-permission to actuate but warning

* * * * *